Figure 1:
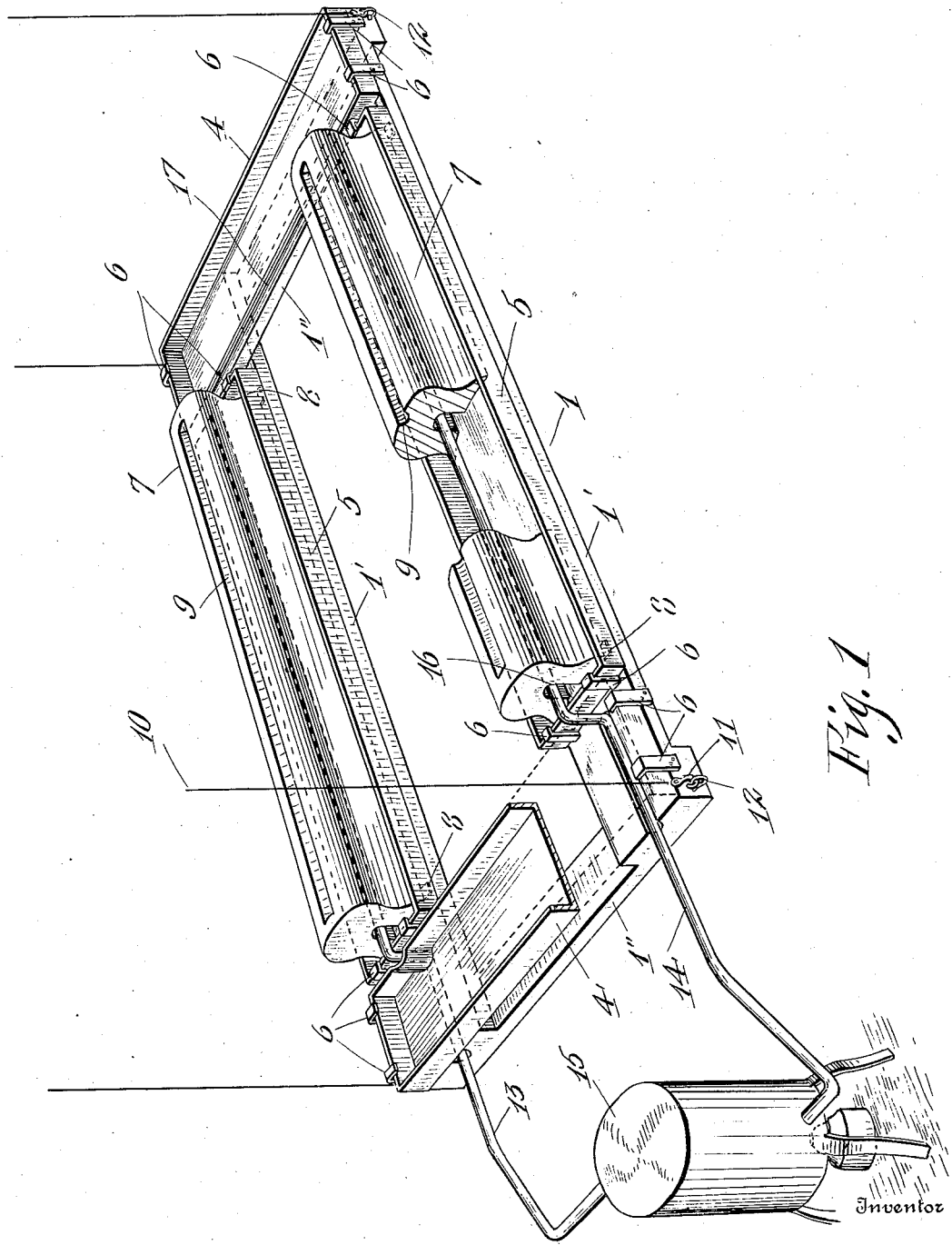

J. L. HERMAN.
CHICKEN ROOST.
APPLICATION FILED JAN. 20, 1909.

938,234.

Patented Oct. 26, 1909.
2 SHEETS—SHEET 1.

Witnesses
Arlita Adams
Louise Randlett

Inventor
J. L. Herman
By Adams & Brooks
Attorneys

J. L. HERMAN.
CHICKEN ROOST.
APPLICATION FILED JAN. 20, 1909.
938,234.
Patented Oct. 26, 1909.
2 SHEETS—SHEET 2.
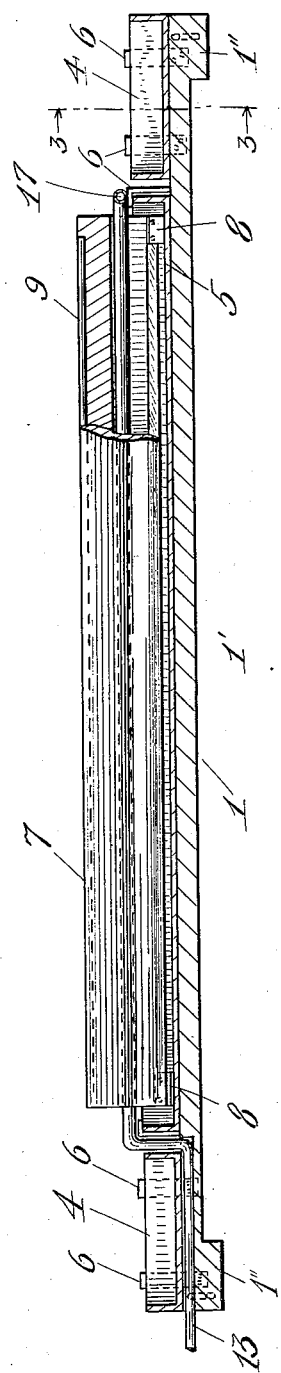
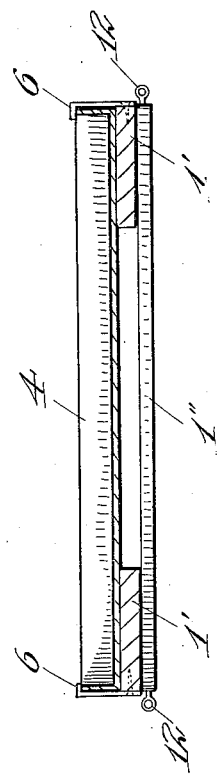
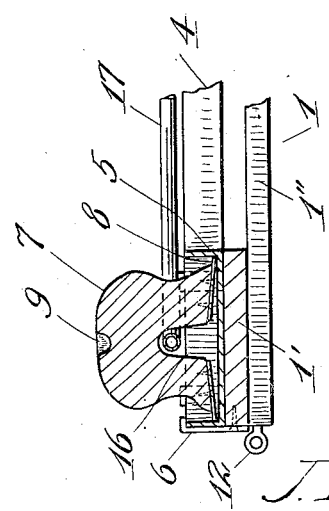
Witnesses
Arlita Adams
Louise Raudlett
Inventor
J. L. Herman
By Adams & Brooks
Attorneys

UNITED STATES PATENT OFFICE.

JOHN LARRY HERMAN, OF MARBLEMOUNT, WASHINGTON.

CHICKEN-ROOST.

938,234.       Specification of Letters Patent.       Patented Oct. 26, 1909.

Application filed January 20, 1909. Serial No. 473,392.

*To all whom it may concern:*

Be it known that I, JOHN LARRY HERMAN, a citizen of the United States of America, and a resident of the town of Marblemount, county of Skagit, and State of Washington, have invented certain new and useful Improvements in Chicken-Roosts, of which the following is a specification.

My invention aims primarily to provide a roost for chickens and the like which can be kept in a sanitary condition and which, by its construction, will aid in the extermination of the vermin carried by the chickens.

With this main object in view, my invention resides in the features of construction, arrangements and combinations of parts, hereinafter described and succinctly pointed out in my appended claims.

Referring to the accompanying drawings in which like numerals of reference indicate like parts throughout the several views: Figure 1 is a view in perspective of my invention, parts being broken away. Fig. 2 is a longitudinal sectional view thereof, one of the roosts being broken away. Fig. 3 is a section taken on line 3—3 of Fig. 2, and Fig. 4 is a fragmentary cross sectional view, illustrating more particularly the arrangement of one of the roosts in its protecting pan.

In carrying out my invention I provide a support 1 which is conveniently of open formation, comprising the spaced side and end rails 1', 1'' respectively.

Reference numerals 4 and 5 designate pans adapted to receive a disinfectant or insecticide of liquid form, the pans 4 being supported on the end rails 1'' and the pans 5 on the side rails 1', as clearly illustrated in Fig. 1.

Reference numeral 6 indicates guides for supporting the pans 4 and 5 for sliding on the support 1, as will be readily understood, whereby they can be readily removed for the purpose of cleaning.

In the pans 5 I removably arrange roosts 7, the same resting on the bottoms of said pans so as to have their lower portion submerged and having their upper portions suitably disposed above the side walls of the pans, as shown.

Reference numeral 8 indicates spacing members secured to the roosts 7, and adapted to engage the side walls of the pans 5 to insure of the roosts 7 being properly positioned with their sides spaced from the adjacent side walls of said pans 5. In furtherance of this object of obtaining sufficient spacing between the side walls of the pans 5 and the adjacent walls of the roosts 7, I chamfer the sides of the latter, as more clearly shown in Fig. 4.

The roosts 7 are formed in their upper surface portions with grooves 9 adapted to receive insecticide, which may be of powder or paste form, through the medium of which the feathers of the roosting fowls will be permeated by rising fumes. The pans 4 are preferably not provided with roosts, containing only an insecticide as hereinbefore set forth.

The support 1 can be held in an elevated position in any desired manner. I prefer however to suspend the same, as by wires or other suitable flexible means, as 10, the same being provided at their lower portions with hooks 11 which are engaged with eyes 12 of the support 1.

If desired, heat may be applied to the roosts, the means now employed by me for accomplishing this object, consisting of pipes 13 and 14 through which water is circulated, as from a heater 15. Pipes 13 and 14 are received in grooves 16 formed in the lower portions of the roosts 7, so as to permit of the latter being removed without disturbing said pipes, and are connected by a return bend 17, as clearly shown in Fig. 1. At their inner end portions, the pipes 13 and 14 are bent downwardly so as to normally lie beneath the adjacent pan 4.

My invention is of simple construction, can be manufactured at a comparatively small cost, and aside from being readily removed for the purpose of cleaning either the roosts alone, or the pans 4 and 5, or the device as an entirety, the latter being accomplished by disengaging the hooks 11 from the eyes 12, presents a neat appearance.

The support 1 and roosts 7 are preferably formed of wood, they may however, be of any desired material, and likewise such changes in the structural details can be made, as fall within the scope of my annexed claims.

Having thus fully described my invention, what I claim as new and desire to secure by Letters Patent of the United States, is:

1. In combination with a support, and guides carried thereby, a liquid container mounted on the support and removably-held thereon by said guides, and a roost removably-positioned in and supported by said liquid container.

2. In combination with a support, and guides carried thereby, a liquid container mounted on the support and engaged at its ends by said guides, a roost mounted in said container and supported thereby and spacing members carried by the roost for positioning same within the container.

3. In combination with a support, guide means thereon, a pan mounted on the support and slidably engaged with said guide means, a roost removably arranged in said pan, and having its side walls chamfered from end to end to space them from the side walls of the pan and members secured to the base of said roost for holding the same spaced from the walls of said pan.

4. In combination with a support, spaced parallel liquid receiving pans removably-mounted on the support, roosts removably-mounted in and supported by the pans, each roost provided in the lower face with a groove extending from end to end of the roost, heat conducting pipes extending through said grooves and overlying the pans, said roosts being removable without disturbing the heat conducting pipes, and a common source of heat supply for said pipes.

Signed at Marblemount, Wash. this 10th day of January 1909.

JOHN LARRY HERMAN.

Witnesses:
P. V. PUSSENTIN,
F. H. BERRY.